United States Patent [19]

Ljubimov et al.

[11] 4,356,759

[45] Nov. 2, 1982

[54] HYDRAULIC CONTROL SYSTEM OF A TRANSPORT VEHICLE

[76] Inventors: Boris A. Ljubimov, Verkhnyaya ulitsa, 18, kv. 30, Moscow; Evgeny N. Chervyakov, Mozhaiskoe shosse, 38, kv. 36, Odintsovo Moskovskoi oblasti; Jury I. Sudakov, ulitsa akademika Komarova, 10, kv. 45, Moscow; Valery Y. Obidin, Novoryazanskaya ulitsa, 2/7, kv. 75, Moscow; Iraida S. Pogorelova, Uralskaya ulitsa, 5, kv. 138, Moscow; Grigory E. Ogy, ulitsa Mira, 20, kv. 30, Kharkov; Leonid A. Vainshtein, ulitsa Bairona, 161"r", kv. 27, Kharkov; Lazar A. Pann, ulitsa Mira, 20, kv. 150, Kharkov, all of U.S.S.R.

[21] Appl. No.: 886,772

[22] Filed: Mar. 14, 1978

[51] Int. Cl.³ ................... B62D 5/08; F15B 13/042
[52] U.S. Cl. ........................................... 91/31; 60/384; 91/6; 180/132
[58] Field of Search ............... 91/6, 29, 31, 28; 180/132, 133; 60/385, 386, 384

[56] References Cited

U.S. PATENT DOCUMENTS

| | | | |
|---|---|---|---|
| 2,391,930 | 1/1946 | Stone | 60/386 |
| 3,403,512 | 10/1968 | Malott | 60/386 |
| 3,902,401 | 9/1975 | Allen et al. | 91/6 |
| 4,041,836 | 8/1977 | Murata | 91/31 X |
| 4,043,419 | 8/1977 | Larson et al. | 180/132 |
| 4,052,929 | 10/1977 | Baatrup et al. | 91/29 |
| 4,065,921 | 1/1978 | Baatrup et al. | 60/386 X |
| 4,112,822 | 9/1978 | Murata | 91/29 |

FOREIGN PATENT DOCUMENTS 1780333 12/1971 Fed. Rep. of Germany .
2305798 8/1974 Fed. Rep. of Germany .
2443657 3/1976 Fed. Rep. of Germany ...... 180/132

Primary Examiner—Irwin C. Cohen
Attorney, Agent, or Firm—McAulay, Fields, Fisher, Goldstein & Nissen

[57] ABSTRACT

A hydraulic control system of a transport vehicle, wherein the flow of hydraulic fluid from the source of pressure is fed to the servomotor through a control hydraulic circuit which incorporates a fluid directional control device mechanically linked to a steering unit of a transport vehicle, a number of hydraulic lines and at least one throttle regulator, and through the actuating hydraulic circuit which incorporates a number of hydraulic lines, a throttle regulator and a discrete-type three-position fluid directional control device controlled by a pressure of the fluid flows admitted along the hydraulic lines communicated with the fluid directional control device of the control hydraulic circuit. The throttle regulator of the actuating hydraulic circuit is situated in a hydraulic line thereof before its connection to the inlet of the fluid directional control device, whereas the control hydraulic circuit is connected to the hydraulic line of the actuating hydraulic circuit on its portion located between the inlet to the fluid directional control device and the throttle regulator of the actuating hydraulic circuit.

10 Claims, 2 Drawing Figures

HYDRAULIC CONTROL SYSTEM OF A TRANSPORT VEHICLE

The present invention relates generally to hydraulic control systems and more specifically to hydraulic steering systems of a transport vehicle.

FIELD OF THE INVENTION

The hydraulic system proposed in the present invention is most expediently applied to wheeled tractors and road construction machines.

The proposed hydraulic system can also find utility when employed in other transport vehicles, such as ships and relatively high load-capacity motor trucks.

DESCRIPTION OF THE PRIOR ART

Hydraulic control systems of transport vehicles are known to comprise two hydraulic circuits, viz., the control circuit and the actuating circuit. The flows of pressure fluid circulating in both circuits merge before entering the servomotor.

The control hydraulic circuit comprises a fluid directional control device communicating with a source of pressure, and hydraulic lines incorporating fluid flow regulators (throttles), the directional control device of the control hydraulic circuit being mechanically linked to the steering wheel of the transport vehicle.

The actuating hydraulic circuit comprises a continuous-action fluid directional control device communicating with a source of pressure, and hydraulic lines incorporating fluid flow regulators (throttles), provision being made in the directional control device of the actuating hydraulic circuit for throttle regulators adapted to control the fluid flow in the actuating circuit directed from the source of pressure to the exhaust (return) line and to the servomotor.

The fluid directional control device of the actuating hydraulic circuit is communicated, for the purpose of controlling the travel of its operating member through check valves, with the hydraulic lines connected to the fluid directional control device of the control hydraulic circuit, and with the hydraulic lines of the actuating hydraulic circuit which are connected to the throttle regulators thereof.

The operating member of the fluid directional control device of the actuating hydraulic circuit is in fact a means for comparing the fluid pressure forces and has a great number of intermediate working positions.

To provide for fluid return flow, check valves are situated in parallel with the throttle regulators of the control and actuating hydraulic circuits.

The sources of pressure fluid flow in both hydraulic circuits are independent of each other.

However, the known hydraulic control systems incorporate a relatively great number of hydraulic elements, such as throttles, throttle valves, check valves, stop valves, etc. that need pinpoint adjustment which adversely affects the operating reliability of the hydraulic system.

Moreover, the afore-discussed hydraulic system requires two sources of pressure to operate, or involves the use of a fluid flow divider which also complicates the hydraulic control system.

OBJECTS AND SUMMARY OF THE INVENTION

It is an object of the present invention to provide a hydraulic control system of a transport vehicle, wherein hydraulic communications between the fluid directional control devices and the throttle regulators of the control and actuating hydraulic circuits are so effected as to simplify the hydraulic system.

It is another object of the present invention to increase the operational reliability of a hydraulic control system of a transport vehicle.

In keeping with above and other objects, there is proposed herein an hydraulic control system of a transport vehicle, wherein the flow of hydraulic fluid from a source of pressure is fed to the servomotor through a control hydraulic circuit incorporating a fluid directional control device which is mechanically linked to the steering unit of transport vehicle, a number of hydraulic communication lines and at least one throttle regulator, and through the actuating hydraulic circuit incorporating a number of hydraulic communication lines, a throttle regulator and a fluid directional control device controlled by the pressure of the fluid flow from the hydraulic lines communicated with the fluid directional control device of the control hydraulic circuit, according to the invention the throttle regulator of the actuating hydraulic circuit is situated in the hydraulic line thereof before the point of connection of said line to the inlet of the fluid directional control device, and the control hydraulic circuit is communicated with the hydraulic line of the actuating hydraulic circuit at the point located in between the point of connection of said line to the fluid directional control device and the throttle regulator of the actuating hydraulic circuit, whereas the fluid directional control device of the actuating hydraulic circuit is in fact a discrete-type three-position one.

It is expedient that the hydraulic lines of the control hydraulic circuit which are connected to the fluid directional control device thereof, be selectively communicated with the throttle regulator of said circuit through the discrete-type three-position fluid directional control device of the actuating hydaulic circuit. Such a communication of the fluid directional control device of the control hydraulic circuit with the throttle regulator thereof proves to be most reliable in the course of operation.

It is not less expedient that the hydraulic system of the invention includes a valve adapted to balance the pressure of the fluid flows before their admission respectively to the throttle regulator of the control hydraulic circuit and to the throttle regulator of the actuating hydraulic circuit which is connected to the hydraulic line thereof in series with its throttle regulator, and is adapted to be controlled by virtue of a fluid differential pressure in the hydraulic lines upsteam of said throttle regulators.

Provision of said valve contributes to higher accuracy of fluid flow-rate control in the actuating hydraulic circuit depending upon the fluid flow-rate in the control hydraulic circuit.

It is practicable that provision be made between the source of pressure and the fluid directional control device of the control hydraulic circuit, for a valve adapted to restrict the flow-rate of fluid admitted to said directional control device, and communicated with the exhaust line.

Such valves are reasonable to be used in hydraulic system featuring relatively high flow-rates of working fluid exceeding maximum flow-rates permissible for the fluid directional control device of the control hydraulic circuit.

It is likewise appropriate that the throttle regulator of at least either of the hydraulic circuits have its flow passage area made adjustable so as to change the ratio between the fluid flow-rates of the control and actuating hydraulic circuits by resorting to a simple adjustment procedure.

The hydraulic control system of a transport vehicle effected according to the present invention has a simple construction, comprises but inconsiderable amount of hydraulic elements and is operationally reliable.

BRIEF DESCRIPTION OF THE DRAWINGS

Given below is a detailed description of some specific embodiments of the present invention with reference to the accompanying drawings, wherein.

DETAILED DESCRIPTION OF THE PREFERRED EMBODIMENTS

Figure 1:
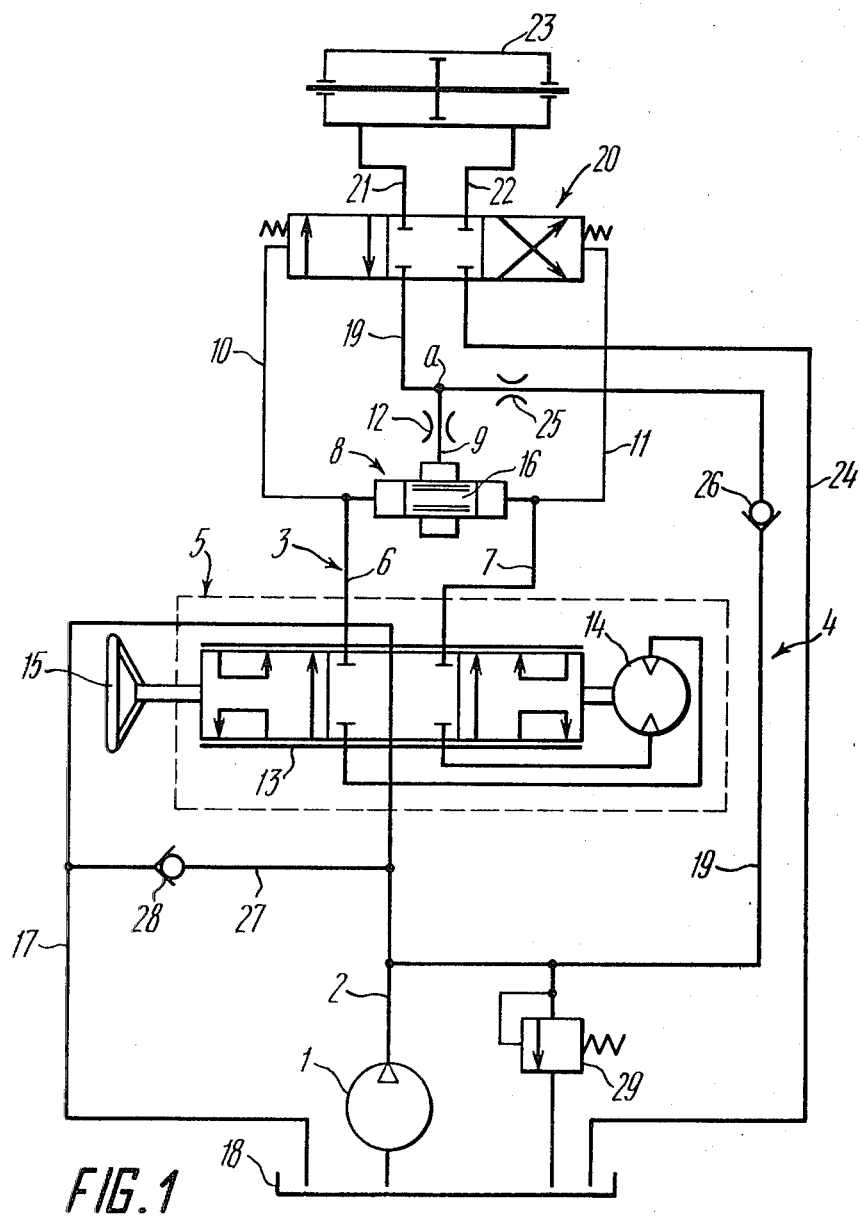
FIG. 1 is a schematic view of a hydraulic control system of a transport vehicle, according to the invention.

The hydraulic steering system of a transport vehicle comprises a pump 1 adapted to establish a pressure fluid flow. The pump 1 communicates through a hydraulic line 2 with a control hydraulic circuit 3 and an actuating hydraulic circuit 4.

The control hydraulic circuit 3 incorporates a fluid directional control device 5, hydraulic lines 6 and 7, a valve 8, hydraulic lines 9, 10, 11 and throttle regulator 12.

The fluid directional control device 5 comprises a directional valve 13 and a proportioning motor 14, both being hydraulically intercommunicated. In order to control the travel of its operating member (not shown) the directional control valve 13 is mechanically linked to a steering wheel 15. The directional valve 13 communicates, through the hydraulic lines 6 and 7 with the chambers of the valve 8 situated at the opposite ends of its sliding member 16. The valve 8 is adapted for selectively correcting the hydraulic line 6 or 7 with the hydraulic line 9. The directional valve 13 communicates with the exhaust (return) line, i.e., a tank 18 through a hydraulic line 17.

The actuating hydraulic circuit 4 comprises: a hydraulic line 19 communicating with the pump 1 through the hydraulic line 2, a fluid directional control device 20 communicating through hydraulic lines 21 and 22 with a servomotor 23 which is kinematically linked to the transport vehicle steering mechanism (not shown), and through an hydraulic line 24 with the tank 18.

A throttle regulator 25 is provided in the hydraulic line 19 before its connection to the inlet of the fluid directional control device 20. To prevent fluid backflow the hydraulic line 19 is provided with a check valve 26. The directional control device 20 communicates with the hydraulic lines 10 and 11 of the control hydraulic circuit in order to control the travelling of its operating member (not shown).

The control hydraulic circuit 3 is connected with the hydraulic line 19 of the actuating hydraulic circuit 4 at the point "a" located between the inlet of the hydraulic line 19 into the fluid directional control device 20 and the throttle regulator 12 of the control hydraulic circuit 3.

The fluid directional control device 20 is of the discrete-type having three working positions; it is hereinafter referred to as the directional control valve 20 and is adapted to shut off the hydraulic lines 19, 24, 21 and 22 when its operating member assumes the neutral (crossover) position and to selectively, connect the hydraulic lines 21 and 22 with the hydraulic lines 19 and 24 when its operating member is in either of its extreme positions.

The hydraulic line 2 is connected with the hydraulic line 17 through a hydraulic line 27, wherein a check valve 28 is provided. The check valve 28 is adapted to open when the fluid flow passes from the hydraulic line 17 to the hydraulic line 2. A safety valve 29 is located between the hydraulic line 19 and the tank 18.

Figure 2:
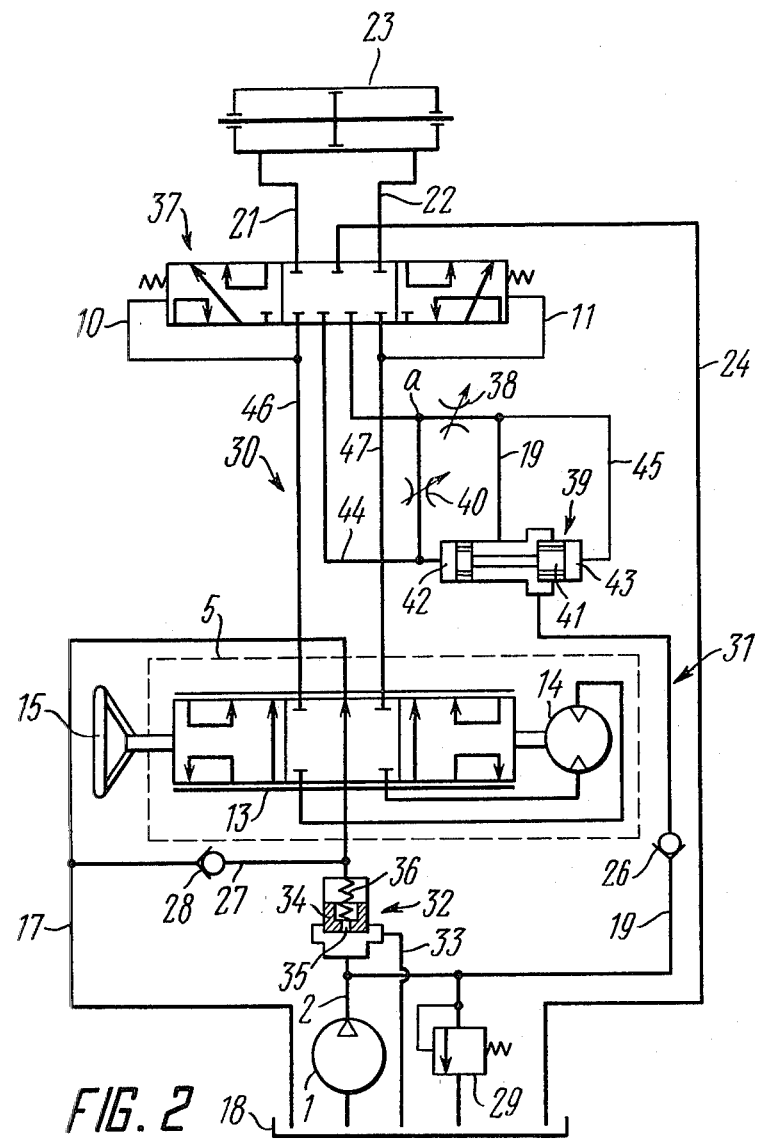
FIG. 2 is another embodiment of a hydraulic control system of a transport vehicle.

Another embodiment of the hydraulic control system of the invention is represented in FIG. 2 and features two hydraulic circuits, viz., a control circuit 30 and an actuating circuit 31.

The fluid directional control device 5 of the control hydraulic circuit 30 is similar to that described above and is therefore indicated by the same reference numerals.

In the disclosure that follows all elements similar to those described above are identified by the same reference numerals.

The hydraulic line 2 connecting the directional control valve 13 with the pump 1, is provided with a valve 32 adapted to restrict the rate of flow of fluid admitted to pass into valve 13.

The valve 32 is connected with the tank 18 through a hydraulic line 33. A sliding member 34 of the valve 32 has a metering orifice 35 and a spring 36.

The hydraulic line 19 of the actuating hydraulic circuit 31 which connects the pump 1 with a directional control valve 37 of said circuit, is connected to the hydraulic line 2 between the pump 1 and the valve 32. A valve 39 is provided in the hydraulic line 19 between the check valve 26 and a throttle regulator 38, adapted for balancing the pressure of the fluid flows before they respectively enter a throttle regulator 40 of the control hydraulic circuit 30 and the throttle regulator 38 of the actuating hydraulic circuit 31.

The valve 39 has a spool 41 which, when sliding thereinside, throttles the fluid flow admitted to the throttle regulator 38 from the hydraulic line 19. Chambers 42 and 43 of the valve 39 located at the opposite ends of the spool 41 are connected respectively to a hydraulic line 44 of the control hydraulic circuit 30 which is connected with the throttle regulator 40 and to an hydraulic line 45 of the actuating circuit 31 which is connected to the hydraulic line 19 upstream of its connection to the throttle regulator 38.

The directional control valve 13 of the control hydraulic circuit 30 communicates, through hydraulic lines 46 and 47, with a directional control valve 37 which is in effect a discrete-type three-position valve.

The hydraulic lines 46 and 47 communicate with the throttle regulator 40 through the hydraulic line 44 when the operating member of the directional control valve 37 is in either of its extreme positions.

The throttle regulators 38 and 40 have adjustable flow passage areas to change the ratio between the fluid flow-rates of the control and actuating hydraulic circuits, adjustment being carried out by any means suitable for the purpose.

The hydraulic steering system of a transport vehicle proposed in the present invention, operates as follows.

With the straight running of the transport vehicle, the flow of the hydraulic fluid from the pump 1 passes along the hydraulic line 2 to the fluid directional control device 5; as its operating member assumes the neutral (crossover) position, the fluid flow is admitted to pass to the hyraulic line 17 and further on to the tank 18.

When the transport vehicle is to be turned, one must rotate the steering wheel 15 in the appropriate direction. As a result, the operating member of the fluid directional control device 5 which is mechanically linked to the steering wheel, is made to slide, thus throttling the fluid flow passing from the pump 1 to the hydraulic line 17 and directing part of said flow to the hydraulic line 6 which communicates, through the hydraulic line 10, with the directional control valve 20 so as to cause sliding of its operating member. At the same time, the hydraulic line 7 along with the hydraulic line 11 connected thereto, are connected with the hydraulic line 17 via the directional control valve 13. The sliding member 16 of the valve 8 is urged to travel to the right (as shown in the drawing) by virtue of the pressure of the fluid flow effective in the hydraulic line 6, and the fluid flow is admitted to pass to the hydraulic line 9 and, through the throttle regulator 12, to the hydraulic line 19.

Meanwhile, the operating member of the directional control valve 20 is urged, by virtue of the fluid flow pressure effective in the hydraulic line 10, to travel from the neutral position to either of its extreme positions (the left-hand one as shown in the drawing). The other part of the fluid flow delivered by the pump 1 passes through the hydraulic line 19 and the throttle regulator 25 to the directional control valve 20. The flow passing from the throttle regulator 12 and that from the throttle regulator 25 merge at the point "a" situated between the throttle regulator 25 and the point of connection of the hydraulic line 19 to the directional control valve 20. Then the united fluid flow is admitted to the directional control valve 20 and therefrom to the hydraulic line 21 and to the space of the servomotor 23 to displace the operative member thereof linked to the steering mechanism of the transport vehicle.

From the other space of the servomotor 23, fluid passes along the hydraulic line 22, via the directional control valve 20 and the hydraulic line 24 to the tank 18.

Upon turning the steering wheel in the opposite direction, the hydraulic system operates in a similar way, the hydraulic lines 7, 11 and 22 being connected with the pump 1 and the hydraulic lines 21, 10 and 6 with the tank 18.

An indispensable prerequisite of normal operation of the herein-considered hydraulic control system is the provision of a functional relationship between the fluid flow-rate effective in the actuating hydraulic circuit 4 and the fluid flow-rate in the control hydraulic circuit 3 set by the fluid directional control device 5.

Inasmuch as the fluid flows of the control and actuating hydraulic circuits originate in the same hydraulic line 2 connected with the pump 1, the differential pressures effective in said circuits from their origin to the point "a" where the control and actuating flows merge, located downstream of the throttle regulators 12 and 25, are equal to each other. Provided that hydraulic pressure losses in the hydraulic lines and the fluid directional control device 5 are negligible, the differential pressures on the throttle regulators 12 and 25 are practically the same. Hence the ratio between the flow-rates of the two circuits depends upon the ratio to the flow passage areas of the throttle regulators 12 and 25. When one changes the flow-rate of the control hydraulic circuit 3 with the use of the fluid directional control device 8, this will change the differential pressure on the throttle regulator 12 and hence the pressure developed by the pump 1 and the differential pressure on the throttle regulator 25, which will bring the rate of working fluid flow in correspondence with that of the control fluid flow.

An excess part of the fluid flow built up by the pump 1 is directed to pass to the tank 18 along the hydraulic line 17.

Whenever pressure losses in the hydraulic lines and the fluid directional control device 5 are rather great, the ratio between the flow-rates of two circuits depends not only on the ratio of the flow passage areas of the throttle regulators 12 and 25 but also on the hydraulic friction heads in the two circuits. Nevertheless, in such a case the condition of a functional relationship of the actuating fluid flow-rate to the control fluid flow-rate in the hydraulic system will be fully met inasmuch as the differential pressures in said circuits are always equal. However, in this case the flow passage areas of the throttle regulators 12 and 25 must be selected taking account of the amount of hydraulic friction in the hydraulic lines so as to ensure a required volumetric relationship of the actuating fluid flow-rate to the control fluid flow-rate.

The hydraulic system according to the embodiment of the invention represented in FIG. 2 operates mainly in the same way as that described in the preceding embodiment described hereinbefore.

In this case, when the steering wheel 15 is turned in one direction, the flow of hydraulic fluid is admitted from the directional control valve 13 to the hydraulic line 46 (or to the hydraulic line 47 when the steering wheel 15 is turned to the opposite direction), and further on through the discrete-type three-position directional control valve to the hydraulic line 44 and the throttle regulator 40 of the control hydraulic circuit 30. The fluid flow of the actuating hydraulic circuit 31 is admitted, upstream of the throttle regulator 38, to pass to the valve 39, the spool 41 of which is urged to slide by virtue of the pressure differential effective in the chambers 42 and 43 communicating with the throttle regulators 38 and 40. Whenever the pressure before the throttle regulator 38 exceeds that before the throttle regulator 40, the spool 41 slides to the left (as shown in the drawing) to obstruct free passage of the fluid flow to the throttle regulator 38. The result is that the pressure before the throttle regulator 38 falls.

Whenever the pressure before the throttle regulator 38 is below that before the throttle regulator 40, the spool 41 slides to the right to admit the fluid to pass to the throttle regulator 38, whereby the pressure before the latter rises. Thus, the spool 41 assumes always a position which tends to equalize the pressure before the throttle regulators 38 and 40; therefore, the ratio of the flow-rates of the control hydraulic circuit 30 and the actuating hydraulic circuit 31 correspond to the ratio of the flow passage areas of the throttle regulators 38 and 40.

As the ratio between the flow-rates of the control and actuating hydraulic circuits changes in response to a change of the flow passage area of either of the throttle regulators 38 and 40, or of both, one can obtain different actuating fluid flow-rates at the same fluid flow-rate of the control hydraulic circuit 30 by virtue of an appropriate adjustment, thus varying the rate of turn of the transport vehicle which is required, e.g., when changing the operating duty of the transport vehicle; specifically, with the throttle regulator 40 fully closed the rate of turn is maximum.

The fluid flow from the pump 1 is admitted to the directional control valve 13 through the orifice 35 of the valve 32 so that only part of the fluid flow developed by the pump 1 is passed to said valve. The other part of the fluid flow passes (when the transport vehicle runs straight) through the valve 32 to the hydraulic line 33 communicating with the tank 18. When the transport vehicle is turned, the fluid directional control valve 13 throttles the fluid flow admitted thereto from the pump 1. In this case, the flow of pressure fluid is admitted to pass to the actuating hydraulic circuit 31, whereas the excess of the fluid flow is throttled by the valve 32 upstream of the hydraulic line 33.

In case the pump 1 is inoperative, the hydraulic system operates as follows. The proportioning motor 14 functions in this case as a hand pump actuated from the steering wheel 15. The flow of hydraulic fluid is, in this case, passed to the hydraulic line 2 through the check valve 28, and to the hydraulic line 27 from the exhaust hydraulic line 17. The fluid flow from the directional control device 5 to the servomotor 23 passes along the pathway described above, i.e., when the pump 1 is operative; in this case, no fluid flow is in the actuating hydraulic circuit, while the check valve 26 is closed.

What is claimed is:

1. A hydraulic control system for hydraulically actuating a servomotor in first and second directions in proportion to a manual input, comprising:
   a source of pressurized fluid; double-acting servomotor;
   a manual input controlled first three-position valve having an input for said pressurized fluid and a fluid return line;
   said first three-position valve having a first position which it assumes in the absence of a manual input, a second position which it assumes in the absence of a manual input requiring said servomotor to move in said first direction and a third position which it assumes in the presence of a manual input requiring said servomotor to move in said second direction;
   first and second outputs of said first three-position valve;
   said first three-position valve being effective to apply fluid pressure from said source to said first output in proportion to said manual input when said first three-position valve is in its second position;
   said first three-position valve being further effective to apply fluid pressure from said source to said second output in proportion to said manual input when said first three-position valve is in its third position;
   a second three-position valve having first, second and third positions, first and second control fluid pressure inlets and a single actuation fluid pressure inlet;
   said first and second outputs being connected to said first and second control fluid pressure inlets, respectively;
   said second three-position valve including means for assuming its first position in the absence of fluid pressure in either of its first and second control fluid pressure inlets, means for assuming its second position in the presence of fluid pressure in its first control fluid pressure inlet, and means for assuming its third position in the presence of fluid pressure in its second control fluid pressure inlet;
   said second three-position valve having first and second actuating fluid outlets connected to corresponding inlets of said servomotor;
   a control fluid throttling member having a first throat area;
   an actuating fluid throttling member having a second throat area;
   an inlet of said actuating fluid throttling member being connected to said source;
   outlets of said control fluid throttling member and said actuating fluid throttling member being combined and applied to said actuation fluid pressure inlet of said second three-position valve;
   pressure responsive means for selecting the higher pressure acting in one of said first and second inlets from said first and second outputs, respectively, and applying said higher pressure to said control fluid throttling member;
   said second three-position valve being effective to block the combined control and actuating fluid from said first and second actuating fluid outlets when in its first position, to apply said combined control and actuating fluid to said first actuating fluid outlet when in its second position and to apply said combined control and actuating fluid to said second actuating fluid outlet when in its third position whereby said servomotor is enabled to remain motionless, move in said first direction and move in said second direction, respectively.

2. A hydraulic control system according to claim 1 wherein said pressure responsive means includes a valve including a sliding member, said first and second outputs of said first three-position valve being connected to opposed ends of said valve, said sliding member being slideable in said valve in response to pressure in said one of said first and second outputs, an outlet in said valve, said sliding member being effective to control flow of fluid from the one of said first and second ends containing fluid pressure to said valve outlet in response to fluid pressure in said first and second ends, said control fluid throttling member being connected between said valve outlet and a point where said control fluid and said actuating fluid are combined.

3. A hydraulic control system according to claim 1, including a valve member having a displaceable spool therein, means for connecting fluid pressure from the one of said first and second outputs of said first three-position valve which contains the higher fluid pressure to a first end of said valve member, an inlet and an outlet of said valve member, said source of fluid pressure being connected to said inlet, said outlet being connected to a second end of said valve member and to said actuating fluid throttling member, and said displaceable spool being effective to control flow of fluid between said inlet and said outlet in proportion to fluid pressure at first and second ends thereof.

4. A hydraulic control system according to claim 1, wherein at least one of said first throat area and said second throat area is adjustable by means whereby said ratio is adjustable.

5. A hydraulic control system according to claim 1, further comprising a pressure regulating valve in series with fluid flow from said source to said input of said first three-position valve.

6. A hydraulic system for controlling a motor vehicle comprising:
   a double-acting servomotor connected to a movable element of said vehicle;
   a source of pressurized fluid;
   a control hydraulic circuit having first and second outlets and including means operative in response to mechanical inputs to selectively apply pressurized fluid from said source to one of said first and second outlets;
   a distribution means having first and second control inlets, a single pressurized fluid inlet, and third and fourth outlets connected to said servomotor;
   a first line from said source to said single pressurized fluid inlet;
   a first throttling valve in said first line;
   second and third lines from said first and second outlets to said first and second control inlets respectively;
   a fourth line connected to said first line between said first throttling valve and said pressurized fluid inlet;
   a second throttling valve in said fourth line;
   pressure responsive means for selecting the higher pressure in one of said second and third lines and applying said higher pressure to said fourth line;
   said distribution means being effective in the presence of higher fluid pressure in its first control inlet than in its second control inlet to selectively apply fluid from its single pressurized fluid inlet to said third outlet and being further effective in the presence of higher fluid pressure in its second control inlet than its first control inlet to apply fluid from its single pressurized fluid inlet to said fourth outlet whereby said servomotor is selectively controlled in first and second directions.

7. A hydraulic system according to claim 6, wherein said pressure responsive means includes valve means in said distribution means.

8. A hydraulic system according to claim 6, wherein said pressure responsive means includes a valve responsive to pressure in said second and third lines to control fluid flow to said second throttling valve.

9. A hydraulic system according to claim 6, further comprising means for restricting flow of pressurized fluid from said source to said control hydraulic circuit.

10. A hydraulic system according to claim 6, wherein at least one of said first and second throttling valves includes means for adjusting an area of a flow passage thereof.

* * * * *